United States Patent
Kim

[19]

[11] Patent Number: 6,134,028

[45] Date of Patent: Oct. 17, 2000

[54] METHOD FOR SCANNING DOCUMENTS

[75] Inventor: Han-Sin Kim, Seoul, Rep. of Korea

[73] Assignee: SamSung Electronics Co., Ltd., Kyungki-do, Rep. of Korea

[21] Appl. No.: 09/110,240

[22] Filed: Jul. 6, 1998

[30] Foreign Application Priority Data

Jul. 4, 1997 [KR] Rep. of Korea ............ 97-30925

[51] Int. Cl.[7] .................................. H04N 1/04
[52] U.S. Cl. ............................ 358/486; 358/494
[58] Field of Search ......................... 358/472, 473, 358/474, 486, 488, 494, 497, 496, 296, 453, 452, 448, 464, 465, 466, 406; 382/312, 313; 250/208.1, 234–236

[56] References Cited

U.S. PATENT DOCUMENTS

| | | | |
|---|---|---|---|
| 4,839,741 | 6/1989 | Wilson | 358/474 |
| 4,947,345 | 8/1990 | Paradise et al. | 358/442 |
| 5,019,916 | 5/1991 | Ogura | 358/401 |
| 5,032,903 | 7/1991 | Suzuki et al. | 358/448 |
| 5,153,736 | 10/1992 | Stemmle | 358/296 |
| 5,264,949 | 11/1993 | Stemmle | 358/474 |
| 5,384,621 | 1/1995 | Hatch et al. | 358/488 |
| 5,446,559 | 8/1995 | Birk | 358/473 |
| 5,663,806 | 9/1997 | Grise et al. | 358/406 |
| 5,682,253 | 10/1997 | Sakamoto | 358/472 |
| 5,721,423 | 2/1998 | Hamamoto | 250/208.1 |
| 5,737,095 | 4/1998 | Kikuchi et al. | 358/486 |
| 5,812,172 | 9/1998 | Yamada | 358/472 |
| 5,880,852 | 3/1999 | Asano et al. | 358/296 |
| 5,896,471 | 4/1999 | Suzuki et al. | 382/313 |

Primary Examiner—Cheukfan Lee
Attorney, Agent, or Firm—Robert E. Bushnell, Esq.

[57] ABSTRACT

Disclosed is a method for scanning documents by a machine including a scanner that moves back and forth, which is capable of preventing unnecessary consumption of printing ink or toner associated with processing unnecessary data by scanning a block of a document support and storing the scanned data as a reference block, scanning the document and generating a document block, comparing the reference block and the document block and detecting a rightmost location of the document, processing data before the rightmost location as document data and processing data after the rightmost location white or skipping the data after the rightmost location.

12 Claims, 4 Drawing Sheets

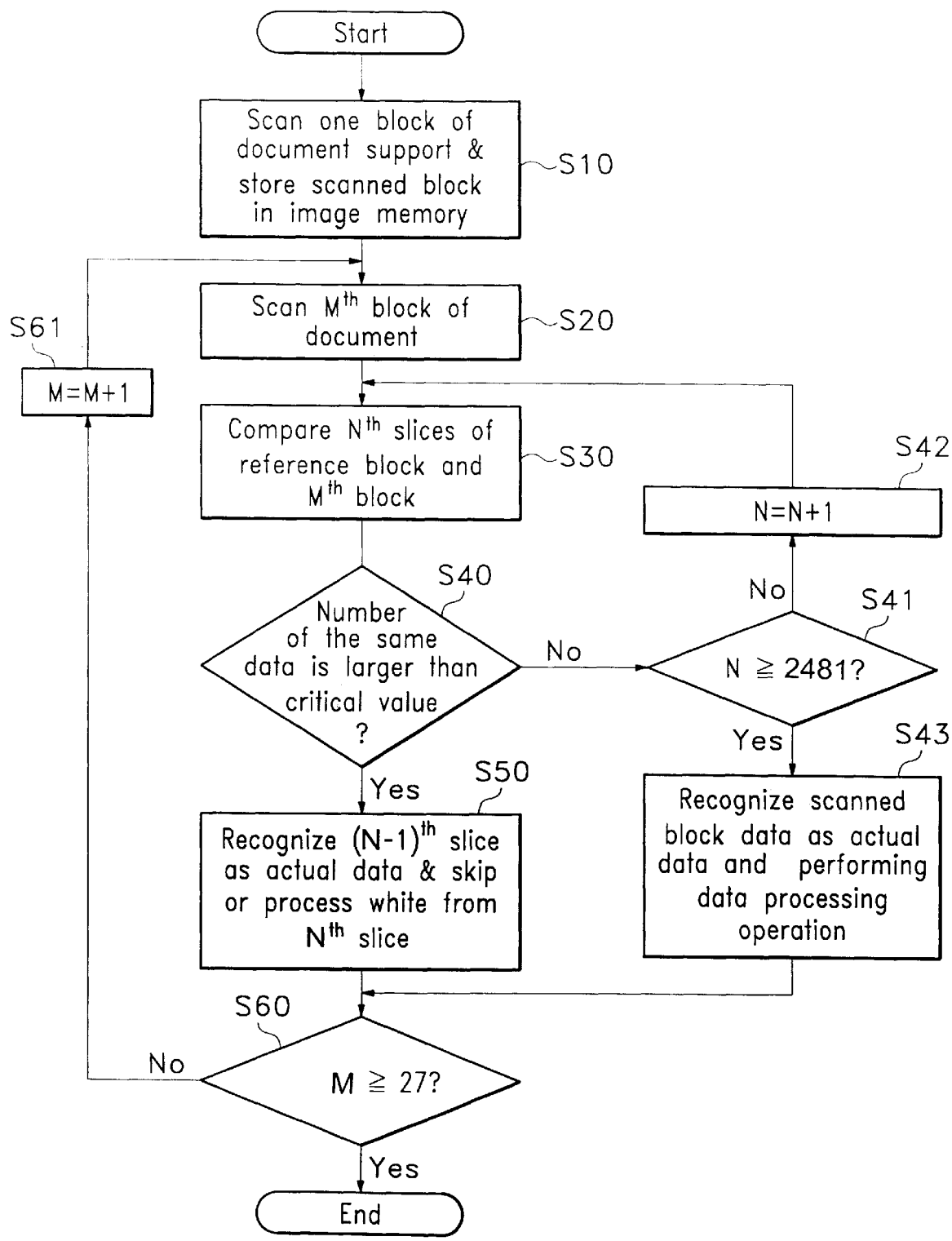

METHOD FOR SCANNING DOCUMENTS

CLAIM OF PRIORITY

This application makes reference to, incorporates the same herein, and claims all benefits accruing under 35 U.S.C §119 from an application entitled *Method For Scanning Documents* earlier filed in the Korean Industrial Property Office on Jul. 4, 1997, and there duly assigned Ser. No. 97-30925 by that Office.

BACKGROUND OF THE INVENTION

1. Field of the Invention

The present invention relates to a method for scanning documents, and particularly to a method for scanning documents by a machine including a shuttle-scanner that scans documents by back-and-forth motion thereof, wherein, when the document is smaller than a maximum size that can be scanned by the machine, data scanned in the area on a document support that is not occupied by the document are processed white or skipped.

2. Description of the Related Art

Nowadays, office automation facilities such as a printer, a scanner, etc. have been widely spread. To extend their own functions, these office automation facilities each having high efficiency have been developed. Accordingly, the manufacturing costs of the products increase and this may impose an economic burden on users.

In recent years, several office automation machines have been combined into one system. Remarkable progress has been made toward the development of a multi-tasking system by combining a printer, a facsimile machine, a scanner, together with other components of image formation equipment. Exemplary practice in the art is found in the structure illustrated by U.S. Pat. No. 4,839,741 to Charles D. Wilson entitled *Image Reproducing Apparatus With CCD Scanner And Bubble Jet Printer Simultaneously Driven By A Common Belt In Opposite Directions And Operated Asynchronously*; U.S. Pat. No. 4,947,345 to Elizabeth M. Paradise et al. entitled *Queue Management System For Multi-Function Copier, Printer, and Facsimile Machine*; and U.S. Pat. No. 5,019,916 to Masaaki Ogura entitled *Digital Copier With A Facsimile Function*.

Conventionally, a multifunctional machine optionally includes a fax machine, a printer, a scanner, a duplicator (copier), a modem and a computer and prints data scanned by the scanner or data transmitted from another system through the modem by the printer or stores the data in a hard disk of the computer. To interface a personal computer (PC), the multifunctional machine such as a multifunctional printer supports Institute of Electrical and Electronics Engineers (IEEE) 1284 as an interface technology that allows bidirectional communication.

When the document to be scanned in a conventional multifunctional machine is smaller than the maximum document size that can be scanned by the machine, for example, when A5 sized document is to be scanned in a conventional multifunctional machine capable of scanning up to A4 sized documents, the scanner in the machine scans a document support for the remaining area that is not occupied by the A5 sized document. The document support may be a white or black panel. When the document support is a white panel, there is no serious problem. However, when the document support is a black panel, the amount of scanned data is increased, for example, data to be processed at the receiving end of a facsimile, is increased by the amount corresponding to the remaining area on the document support. That is, since the remaining area of the black panel that is not occupied by the document is recognized as data, the remaining area is processed as black data and transmitted. The white panel may also have a problem when it is dirty or contaminated by sprayed ink. In this case, the white panel cannot perform its own function as a white panel. The contaminants are recognized as black data and transmitted. As aforementioned, the conventional multifunctional machine suffers from problems of processing data that are not actual data, which results in unnecessary consumption of printing ink or toner.

SUMMARY OF THE INVENTION

Therefore, it is an object of the present invention to provide a method for scanning documents by a machine, which is capable of processing data only in the document when the document is smaller than a maximum size that can be scanned by the machine.

It is another object of the present invention to provide a method for scanning documents, which is capable of reducing unnecessary consumption of printing ink or toner.

According to one aspect of the present invention, a block of a document support of a machine including a scanner that moves back and forth is scanned and the scanned block of the document support is stored as a reference block. Then, a document to be scanned is scanned by the machine and a document block is generated. The reference block is compared to the document block. Thereby, the rightmost location of the document is detected. Data before the rightmost location are processed as document data and data after the rightmost location are processed white or skipped. To detect the rightmost location, the document block and the reference block are compared on a unit of slice. When the same data of a slice of the reference block and a slice of the document block are larger than a predetermined critical value, the location of the slice having the same data is determined as the rightmost location. The document is divided into a predetermined number of document blocks and the above steps are repeatedly carried out for the respective document blocks until the following document is inserted.

The method for scanning documents according to the present invention can be applied to a multifunctional machine including a scanner module and a printer unit that are moved back and forth. For example, the scanner module is moved back and forth. For example, the scanner module is moved in the direction that is perpendicular to the progressing direction of the document and the same as the moving direction of the printing direction.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 5 is a flow chart of a method for scanning a document according to the present invention.

DETAILED DESCRIPTION OF THE PREFERRED EMBODIMENTS

Figure 1:
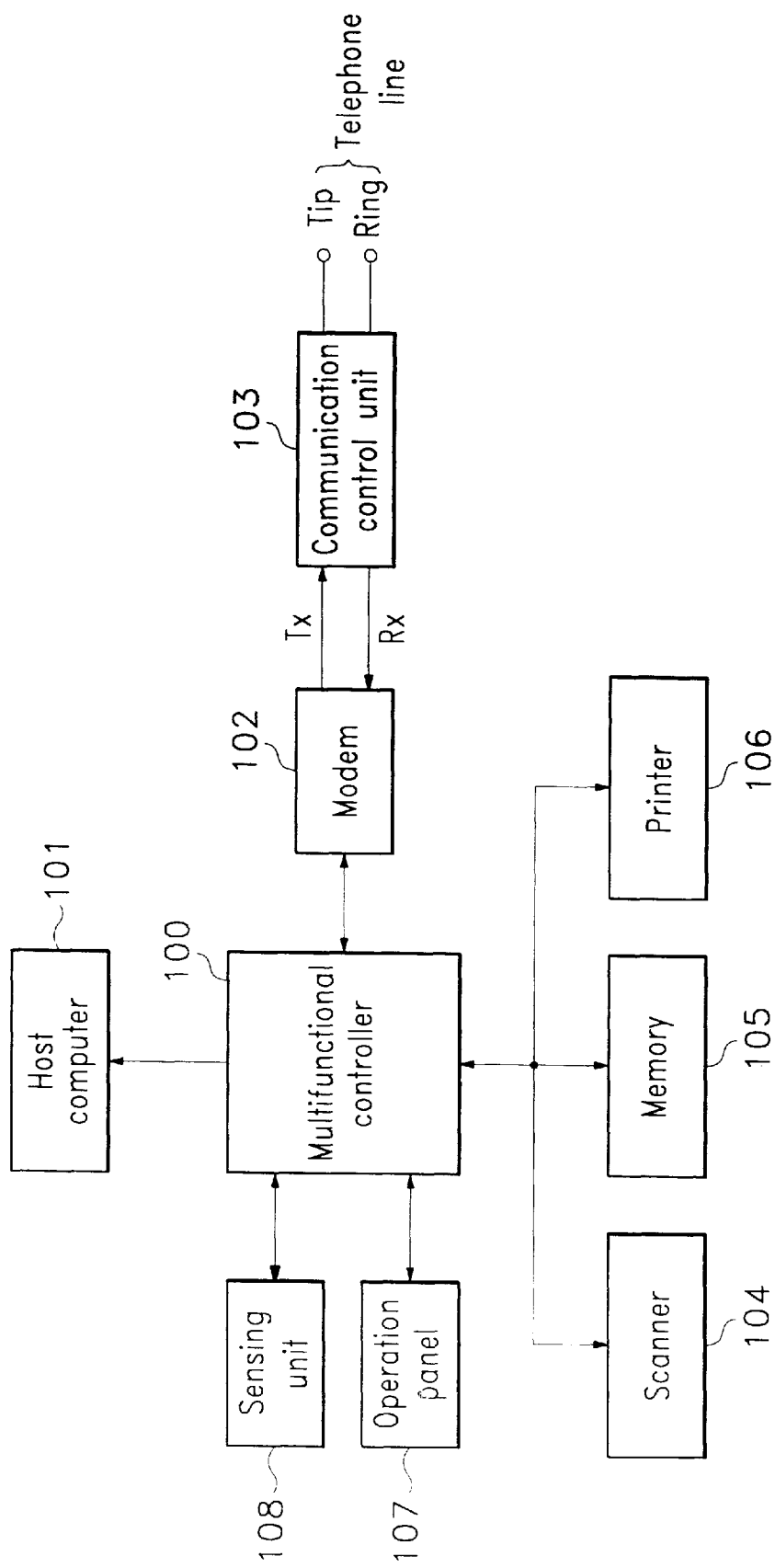
FIG. 1 is a schematic block diagram of a exemplary multifunctional machine system.

FIG. 1 is a block diagram of a exemplary multifunctional machine system. The exemplary multifunctional machine system includes: a multifunctional controller 100 for performing controlling operations according to a predetermined program, for example, controlling a copier operation, a facsimile operation, a scanner operation or a printer operation; a memory 105 for accessing or storing image data and received data according to control of the multifunctional controller 100; an operation panel 107 including a plurality of keys (not shown) for generating function key data of the system and a display unit (not shown) for inputting the key data generated by the plurality of keys into the multifunctional controller 100 and displaying display data of the multifunctional controller 100; a scanner 104 for scanning image of the document and supplying the multifunctional controller 100 with digital image data; a modem 102 for modulating output data from the multifunctional controller 100 into analog data and demodulating received analog data into digital data according to control of the multifunctional controller 100; a communication control unit 103 for forming a communication loop of a telephone line and interfacing modulated-demodulated signals and signals of the telephone line according to the control of the multifunctional controller 100; a host computer 101 for supplying the multifunctional controller 100 with printing data; a printer 106 for printing and duplicating the document image data read from the scanner 104, data received through the modem 102 and the printing data of the host computer 101 according to control signals from the multifunctional controller 100; and a sensing unit 108.

The multifunctional controller 100 further includes: a central processing unit (CPU: not shown) for duplicating the document image data and compressing transmitted and received data during printing operations; a data RAM (not shown) for temporarily storing the image data compressed by the CPU therein; and a program ROM (not shown) including program data and communication protocol data.

Figure 2:
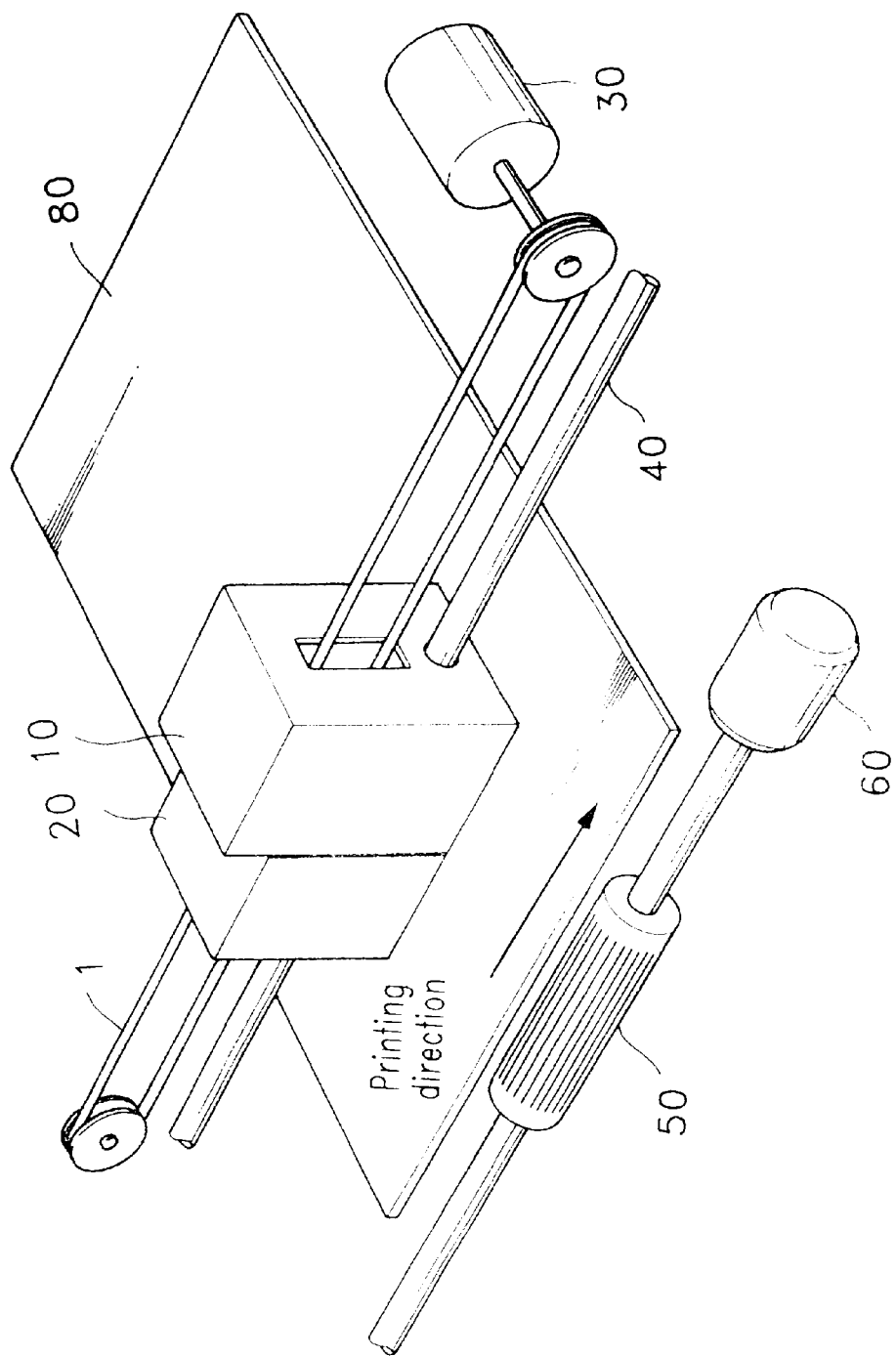
FIG. 2 is a view illustrating a driving unit with a shuttle scanner module loaded thereon of a multifunctional machine for use in the present invention.

FIG. 2 is a view illustrating a driving unit with a shuttle scanner module loaded thereon of a multifunctional machine for use in the present invention. As shown in FIG. 2, the multifunctional machine used in the present invention includes: a scanner module 10 for scanning characters and graphic data recorded on a predetermined document 80; a printer head 20 for printing scanned data and printing data; a carriage return motor 30 for moving the scanner module 10 and the printer head 20 in the direction perpendicular to the progressing direction of the document 80; a supporting shaft 40 for supporting the scanner module 10 and the printer head 20 when they are moving; a line feed roller 50 for press-feeding the document 80 to be printed or scanned; and a line feed motor 60 for transferring the document 80. Reference number 1 in FIG. 2 is a conveyor belt for moving the scanner module 10 and the printer head 20 in a direction transverse to the direction the document is fed.

Since the scanner module 10 and the printer head 20 are commonly supported by the supporting shaft 40, the scanner module 10 and the printer head 20 can be driven by the one carriage return motor 30. A charged coupled device (CCD) of the scanner module 10 has the size of 128×1 dots.

Accordingly, when an A4 sized document having the size of 2481×3507 dots in the case is of 300 DPI is scanned by the CCD, the A4 sized document is divided into 27 shuttle blocks in the feeding (progressing) direction thereof. Each of the shuttle blocks is divided into 2481 slices, i.e., from the $1^{st}$ slice to the $2481^{st}$ slice in the direction perpendicular to the progressing direction of the document. That is, the A4 sized document is scanned in such a manner that the $1^{st}$ slice of the $1^{st}$ shuttle block to the $2481^{st}$ slice of the $27^{th}$ shuttle block are scanned in the direction perpendicular to the document progressing direction.

Accordingly, to scan the document entirely, the scanner module 10 first scans the $1^{st}$ shuttle block. When the $1^{st}$ shuttle block is completely scanned, the line feed motor 60 increases the shuttle block by one in the document progressing direction. Then, the scanner module 10 repeatedly performs the same scanning operation with the $2^{nd}$ shuttle block. To scan the one shuttle block, the scanner module 10 moves back and forth according to the operation of the carriage return motor 30 in the direction perpendicular to the document progressing direction. During the back-and-forth movement of the scanner module 10, the first slice to the final slice of the one shuttle block are scanned.

As a preferred embodiment of the present invention, a method for scanning documents by a multifunctional machine utilizing a scanner module which is capable of scanning up to A4 sized document.

Figure 3:
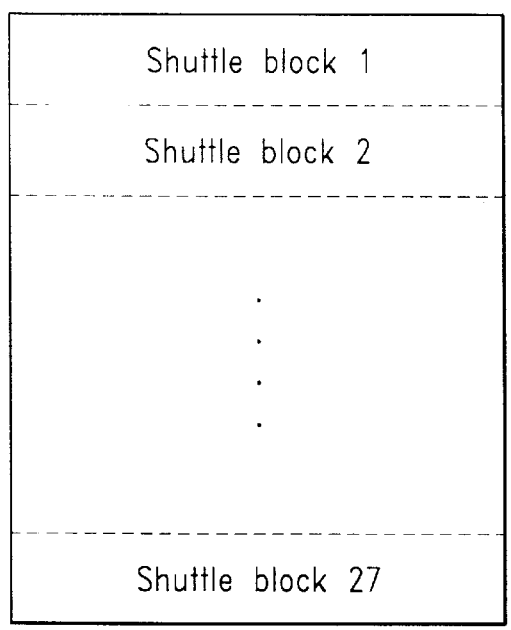
FIG. 3 is a view illustrating a document to be scanned that is divided in to 27 shuttle blocks in the progressing direction of the document.
Figure 4:
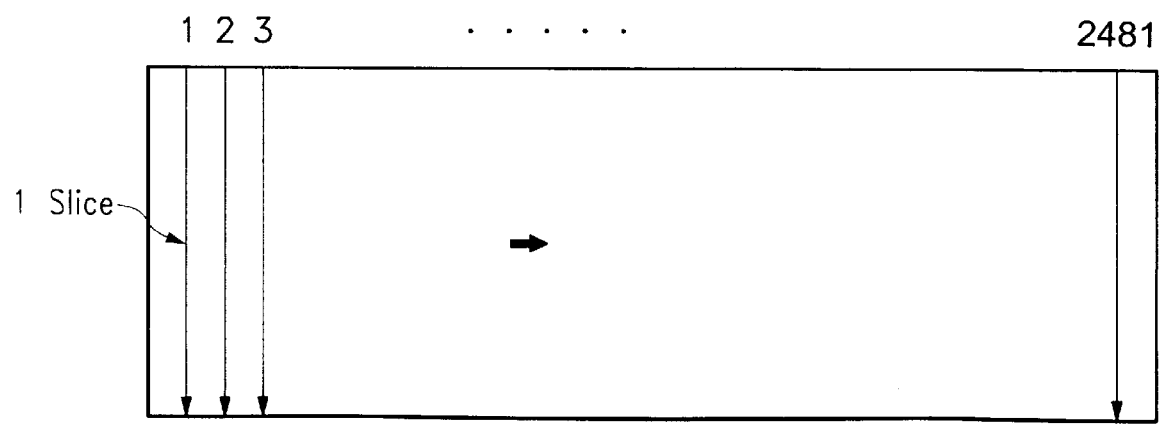
FIG. 4 is a view illustrating a shuttle block of FIG. 3 that is divided into 2481 slices.

FIG. 3 is a view illustrating a document divided into 27 shuttle blocks to be scanned. FIG. 4 is a shuttle block divided into 2481 slices. FIG. 5 is a flow chart of a method for scanning documents according to the present invention.

Referring to FIG. 5, at step S10, the scanner module 10 scans the document support by one block amount and the scanned block is stored in an image memory as a reference block. The size of the reference block depends on the scanning performance of the scanner module 10. In the present embodiment, the reference block has the size of 128×1×2481 dots that is a width size of an A4 sized document.

Thereafter, the $1^{st}$ slice to the $2481^{st}$ slice of a $M^{th}$ shuttle block of a document are scanned by moving the scanner module 10 back and forth in the direction perpendicular to the document progressing direction at step S20, where M is initially set to 1.

At step S30, the $N^{th}$ slice of the scanned $M^{th}$ shuttle block is compared to the $N^{th}$ slice of the reference block stored in the image memory, where N is initially set to 1, to check the amount of common data of the $N^{th}$ slice of the scanned $M^{th}$ shuttle block and the $N^{th}$ slice of the reference block.

Then it is determined, at step S40, whether the amount of common data is larger than a predetermined critical value.

If it is determined that the amount of common data is larger than the critical value at step S40, the process proceeds to step S50.

If it is determined that the amount of common data is smaller than the critical value at step S40, this means that the $N^{th}$ slice of the scanned $M^{th}$ shuttle block is still in the document, and then it is determined whether the number N is larger than 2481, which is the value indicative of the rightmost slice of the A4 sized document, at step S41.

If it is determined that the number N is smaller than 2481 at step S41, then N is increased by one (1) at step S42 and step S30 is repeated for the next $N^{th}$ slice.

If it is determined that the present slice number is the same as or larger than 2481 at step S41, it is determined that the presently inserted document has the maximum size that can be scanned in the machine. Accordingly, the entire data block read in the present shuttle block is recognized and processed as actual data of the document at step S43.

Thereafter, it is determined whether the number M of the present shuttle block is larger than 27, which is the value indicative of the number of the last shuttle block of the document, at step S60. If it is determined that the present shuttle block is not the final shuttle block, i.e., the $27^{th}$ shuttle block, at step S60, the number M of the present shuttle block is increased by one (1) at step S61, and the process returns to step S20.

If it is determined that the number M is the same as or larger than 27 at step S60, this means that the final shuttle block has been completely scanned. Accordingly, the scanning operation is terminated.

If, at step S40, it is determined that the amount of common data is larger than the predetermined critical value, this means that the document being scanned is smaller than the maximum size document that can be scanned and the location of the present slice is off of the document and on the document support. Accordingly, at step S50, only the data right before the present slice are recognized and processed as actual document data. That is, the actual size of the scanned document is indicated by the preceding slice, i.e., the $(N-1)^{th}$ slice. Accordingly, there is no more data to be recognized from the present $N^{th}$ slice. Additionally, the data from the present $N^{th}$ slice is processed as white data when it is transmitted to a facsimile, or is skipped when it is uploaded into a PC. Then the process proceeds to step S60.

While there have been illustrated and described what are considered to be preferred embodiments of the present invention, it will be understood by those skilled in the art that various changes and modifications may be made, and equivalents may be substituted for elements thereof without departing from the true scope of the present invention. For example, the width of the scanning block is not limited to and A4 size document. For example, a letter size document could be scanned, and since the width of a letter size document is 8.5 inches, then the width of the scanning block would be divided into 2550 slices at 300 DPI. In addition, many other modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

As aforementioned, the present invention is capable of preventing unnecessary consumption of printing ink or toner for processing unnecessary data out of a document to be actually scanned in the event the document is smaller than a maximum scanable size by processing the unnecessary data as white data.

What is claimed is:

1. A method for scanning documents by a multifunction machine including a scanner, the method comprising the steps of:
   scanning a block of a document support and storing said scanned block as a reference block in a memory;
   scanning a block of said document and generating a document block;
   comparing said reference block with said document block and determining whether said scanner is currently positioned over said document support or a rightmost portion of said document, wherein said comparing step comprises the steps of:
      dividing said reference block and said document block into a predetermined number of slices in a direction corresponding to a moving direction of said scanner;
      comparing an Nth slice of said reference block and an Nth slice of said document block to detect an amount of common data between said Nth slices, where the value N is initially set to one;
      determining whether the amount of common data is larger than a predetermined critical value;
      determining whether the value N is greater than or equal to a predetermined number, when it is determined that said amount of common data is not larger than said predetermined critical value; and
      recognizing said document block as actual data when it is determined that the value N is greater than or equal to said predetermined number.

2. The method as set forth in claim 1, further comprising a step of increasing said value N by one and performing said step of comparing an Nth slice of said reference block and an Nth slice of said document block to detect an amount of common data between said Nth slices, when it is determined that the value N is not greater than nor equal to said predetermined number.

3. The method as set forth in claim 2, further comprising steps of:
   recognizing, as actual data, the data of said document block up to the slice preceding said Nth slice, when it is determined that said amount of common data is not larger than said predetermined critical value; and
   processing the data of said Nth slice as white data.

4. The method as set forth in claim 3, further comprising steps of:
   determining whether said document block is a last block of said document to be scanned; and
   returning to said step of scanning a block of said document to scan a next block of said document and generate a next document block as said document block, when it is determined that said document block is not said last block of said document to be scanned.

5. The method as set forth in claim 1, further comprising steps of:
   recognizing, as actual data, the data of said document block up to the slice preceding said Nth slice, when it is determined that said amount of common data is not larger than said predetermined critical value; and
   processing the data of said Nth slice as white data.

6. The method as set forth in claim 1, further comprising steps of:
   recognizing, as actual data, the data of said document block up to the slice preceding said Nth slice, when it is determined that said amount of common data is not larger than said predetermined critical value; and
   skipping the processing of the data of said Nth slice.

7. A method for scanning documents by a multifunctional machine including a scanner module and a printer unit that move across a document widthwise as said document is fed lengthwise through a paper path, the method comprising the steps of:
   scanning a block of a document support and storing said scanned block as a reference block in a memory;
   scanning an Mth block of said document and generating a document block, where M is initially set to one;
   dividing said reference block and said document block, widthwise, into a predetermined number of slices;

comparing an Nth slice of said reference block and an Nth slice of said document block to detect an amount of common data between said Nth slices, where N is initially set to one;

determining whether the amount of common data is larger than a predetermined critical value;

determining whether N is greater than or equal to a predetermined number, when it is determined that said amount of common data is not larger than said predetermined critical value; and recognizing said document block as actual data, when it is determined that N is greater than or equal to said predetermined number, and performing a data processing operation on said actual data.

8. The method as set forth in claim 7, further comprising a step of increasing said value N by one and performing said step of comparing an Nth slice of said reference block and an Nth slice of said document block to detect an amount of common data between said Nth slices, when it is determined that the value N is not greater than nor equal to said predetermined number.

9. The method as set forth in claim 8, further comprising steps of:

recognizing, as actual data, the data of said document block up to the slice preceding said Nth slice, when it is determined that said amount of common data is not larger than said predetermined critical value, and performing a data processing operation on said actual data; and processing the data of said Nth slice as white data.

10. The method as set forth in claim 9, further comprising steps of:

determining whether M is greater than or equal to a predetermined block number corresponding to a last block of said document to be scanned;

increasing M by one, when it is determined that M is not greater than nor equal to said predetermined block number; and returning to said step of scanning an Mth block of said document.

11. The method as set forth in claim 7, further comprising steps of:

recognizing, as actual data, the data of said document block up to the slice preceding said Nth slice, when it is determined that said amount of common data is not larger than said predetermined critical value, and performing a data processing operation on said actual data; and processing the data of said Nth slice as white data.

12. The method as set forth in claim 7, further comprising steps of:

recognizing, as actual data, the data of said document block up to the slice preceding said Nth slice, when it is determined that said amount of common data is not larger than said predetermined critical value, and performing a data processing operation on said actual data; and skipping the processing of the data of said Nth slice.

* * * * *